United States Patent
Groeller

(10) Patent No.: US 6,814,474 B2
(45) Date of Patent: Nov. 9, 2004

(54) ILLUMINATED AIR FAIRING DISPLAY

(75) Inventor: Charles J. Groeller, Orefield, PA (US)

(73) Assignee: Mack Trucks, Inc., Allentown, PA (US)

( * ) Notice: Subject to any disclaimer, the term of this patent is extended or adjusted under 35 U.S.C. 154(b) by 35 days.

(21) Appl. No.: 10/124,364

(22) Filed: Apr. 18, 2002

(65) Prior Publication Data

US 2003/0198057 A1 Oct. 23, 2003

(51) Int. Cl.[7] .............................................. B60Q 1/00
(52) U.S. Cl. .................. 362/485; 362/493; 362/496; 362/546; 362/479; 362/480
(58) Field of Search ................. 362/485, 493, 362/496, 546, 479, 480; 296/180.2; 40/556, 588, 590, 591, 592

(56) References Cited

U.S. PATENT DOCUMENTS

| | | | |
|---|---|---|---|
| 1,581,602 A | | 4/1926 | Sponder |
| 2,270,377 A | * | 1/1942 | McLauchlin ................. 40/592 |
| 3,935,654 A | | 2/1976 | Rubin |
| 4,532,579 A | | 7/1985 | Merryman |
| 4,557,517 A | | 12/1985 | Bolduc et al. |
| 4,707,014 A | | 11/1987 | Rich |
| 4,787,665 A | | 11/1988 | Rich |
| 4,868,719 A | | 9/1989 | Kouchi et al. |
| 4,930,834 A | | 6/1990 | Moore |
| 5,249,104 A | | 9/1993 | Mizobe |
| 5,424,924 A | | 6/1995 | Ewing et al. |
| 5,604,480 A | | 2/1997 | Lamparter |
| 5,634,287 A | | 6/1997 | Lamparter |
| 5,673,995 A | | 10/1997 | Segaud |
| 5,700,080 A | | 12/1997 | Okuda |
| 5,836,640 A | | 11/1998 | Hurayt et al. |
| 5,871,254 A | | 2/1999 | Burg |
| 6,042,248 A | | 3/2000 | Hannah et al. |
| 6,132,072 A | | 10/2000 | Turnbull et al. |
| 6,204,820 B1 | | 3/2001 | Jensen, Jr. |
| 6,357,900 B1 | * | 3/2002 | Grossman et al. .......... 362/493 |

* cited by examiner

Primary Examiner—Stephen Husar
Assistant Examiner—Anabel M Ton
(74) Attorney, Agent, or Firm—Rothwell, Figg, Ernst & Manbeck, PC

(57) ABSTRACT

An illuminated air fairing display device for a truck is provided according to one embodiment of the invention. The illuminated air fairing display device includes an air fairing, a light transmissive region in the fairing, and a plurality of light sources positioned in close relation to the light transmissive region. The light transmissive region includes at least one logo or indicium. Light emitted from the plurality of light sources passes through and illuminates the light transmissive region.

24 Claims, 2 Drawing Sheets

SECTION AA

ILLUMINATED AIR FAIRING DISPLAY

BACKGROUND OF THE INVENTION

1. Field of the Invention

The present invention relates generally to a display on a truck, and more particularly to an illuminated air fairing display on a truck.

2. Description of the Background Art

Large numbers of trucks are used every day for all manner of commerce, such as transporting freight, liquids, raw materials, produce, etc. A typical truck may comprise a cab portion, including a passenger compartment, and some manner of cargo box. Some trucks may additionally include a sleeper cabin as part of the truck cab.

One important factor in truck design is efficiency. The air drag of a truck can seriously impact the amount of fuel consumed. Therefore, the aerodynamic shape of the truck is very important. As a result, an increasingly common feature on trucks is an air fairing. The air fairing is used in order to reduce air drag due to any cargo carrying structure behind the cab, such as a cargo box. The air fairing achieves a smooth air flow in the transition between the cab portion and the cargo box, whether the truck is a straight truck, i.e., a cab with a box behind it, or a tractor trailer combination.

Many truck manufacturers put their logo on trucks they produce. This is popular as a way to make sure of visibility for the truck brand and promote owner loyalty. Typically, such a logo may be in the form of hood ornament, indicia on mud flaps or fenders, etc.

However, such displays typically suffer from several problems. A prior art logo is typically fairly low on the truck, and may be easily obscured. In addition, they typically are not easily seen at night, in low light conditions, or in conditions of poor visibility.

Therefore, there remains a need in the art for improvements to displays or logos for trucks.

SUMMARY OF THE INVENTION

An illuminated air fairing display device for a truck is provided according to one embodiment of the invention. The illuminated air fairing display device comprises an air fairing, a light transmissive region in the fairing, and a plurality of light sources positioned in close relation to the light transmissive region. The light transmissive region includes at least one logo or indicium. Light emitted from the plurality of light sources passes through and illuminates the light transmissive region.

A method of forming an illuminated air fairing display for a truck is provided according to another embodiment of the invention. The method comprises the steps of providing an air fairing adapted to attach to a cab portion of the truck, providing a light transmissive region in the fairing, and positioning a plurality of light sources in close relation to the light transmissive region. Light emitted from the plurality of light sources passes through and illuminates the light transmissive region.

The above and other objects, features, and advantages of the present invention will be further understood from the following description of the preferred embodiment thereof, taken in conjunction with the accompanying drawings.

DETAILED DESCRIPTION OF THE PREFERRED EMBODIMENTS

Figure 1:
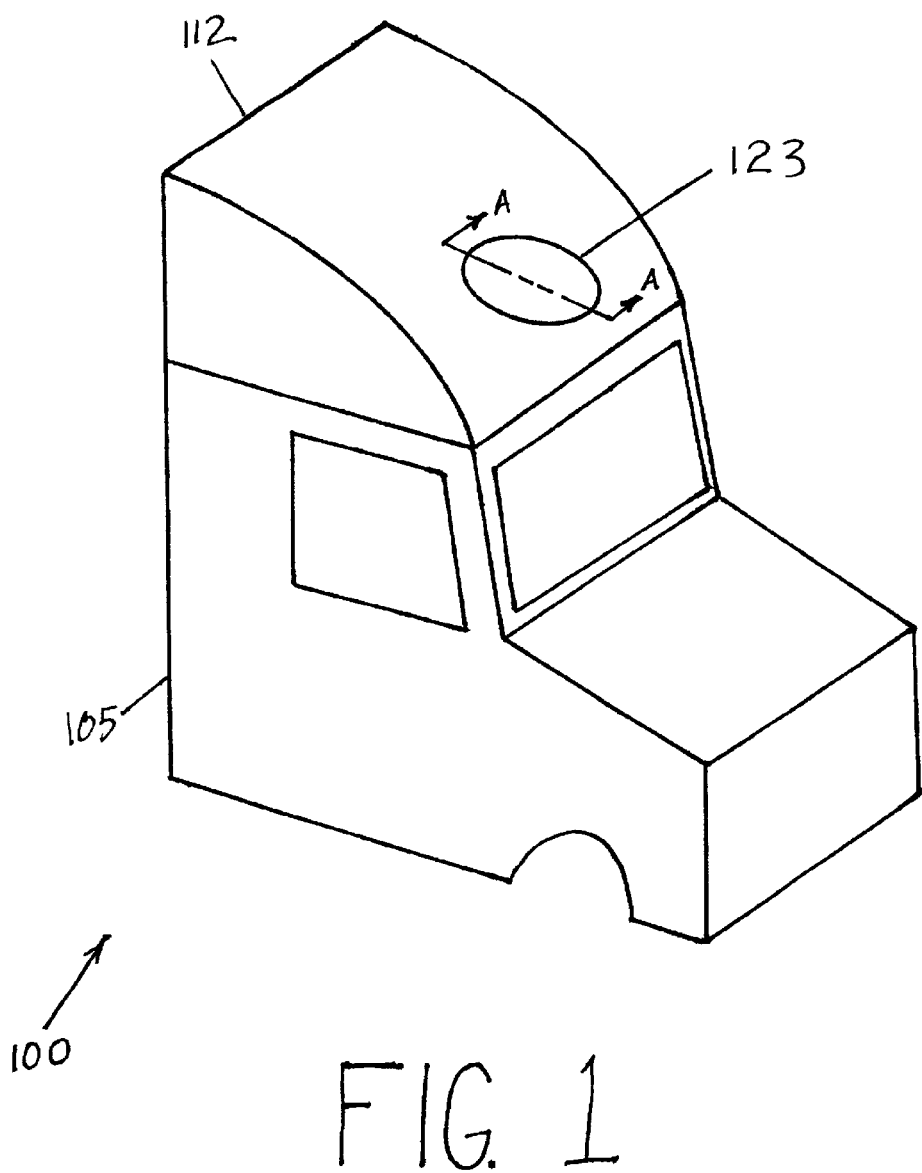
FIG. 1 is a perspective view of a truck including an illuminated air fairing display according to the invention.

FIG. 1 is a perspective view of a truck 100 including an illuminated air fairing display 123 according to the invention. The truck 100 may include a truck cab 105, an air fairing 112, and the illuminated air fairing display 123.

The truck cab 105 may include a passenger cabin and optionally may include a sleeper cabin (not shown). The air fairing 112 may be mounted to the passenger cabin and may alternatively be mounted on or extend over the sleeper cabin if the truck cab 105 includes a sleeper. The air fairing 112 may be an integral part of the truck cab 105 (and/or sleeper) or may be a removable component.

The illuminated air fairing display 123 includes an illuminated light transmissive (i.e., transparent or translucent) region. The illuminated air fairing display 123 may include and display at least one indicium formed on or as part of the light transmissive region (see FIG. 2 and accompanying text). Therefore, the illuminated air fairing display 123 may include at least one indicium and a plurality of light sources, as will be discussed below.

Figure 2:
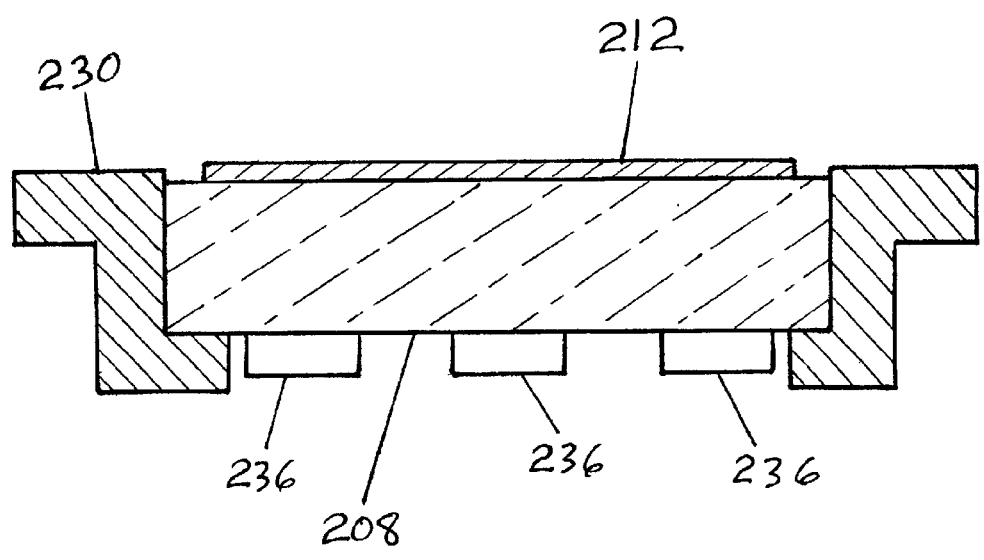
FIG. 2 is a section view of the illuminated air fairing display along the section line AA of FIG. 1.

FIG. 2 is a section view of the illuminated air fairing display 123 along the section line AA of FIG. 1. The illuminated air fairing display 123 includes a translucent or transparent light transmissive substrate 208, at least one indicium 212 formed on the substrate 208, a plurality of light sources 236, and an optional frame 230.

The substrate 208 may be glass, plastic, etc. The substrate 208 may be any manner of material that allows at least some light to pass through. The substrate 208 may be any shape, such as round, oval, rectangular, irregular, etc., and may be of any suitable size. It should be understood that the illuminated air fairing display 123 will be most effective when it is of a size to be easily seen from a distance.

The at least one indicium 212 may be any manner of text, lettering, or graphics, or any combination thereof. For example, the at least one indicium 212 may be a logo, such as a logo of the truck manufacturer. Alternatively, the at least one indicium 212 may be any manner or combination of graphics and text, such as a customized indicia. For example, the owner or operator of the truck may have the indicium 212 custom made to his or her design.

The at least one indicium 212 may be formed on the substrate 208. For example, the at least one indicium 212 may be a mask, an adhesive applique, may be stenciled on with paint, may comprise a roughened surface (such as sandblasted or etched portion of the substrate 208), may be formed of colored material as part of the substrate 208, etc.

Alternatively, the at least one indicium 212 may be formed in the substrate 208 (such as during a casting process) or may be sandwiched between two substrate portions. It should be understood that the manner in which the at least one indicium 212 is created is not important and other constructions or configurations may be employed.

The at least one indicium 212 is lit from below by the plurality of light sources 236 in order to be visible day or night. The illumination may be white light or alternatively may be colored light or light of multiple colors.

The plurality of light sources 236 may be light emitting diodes (LEDs), such as white LEDs, for example. LEDs are advantageous due to their low cost, low current consumption, low heat generation, and ultimately their long life. LEDs are available that can operate continuously for as much as 100,000 hours. Alternatively, the plurality of light sources 236 may be incandescent bulbs, fluorescent bulbs, etc. In addition, the plurality of light sources 236 may be light sources of specific colors or multiple colors.

The plurality of light sources 236 may be permanently or removably affixed to the substrate 208, such as by an adhesive. Alternatively, the light sources 236 may be held in receptacles formed in the frame 230 (not shown). In another alternative, the light sources 236 may be cast into the substrate 208 and may be non-removable.

The frame 230 may be any structure suitable for holding the substrate (and light sources 236) in the air fairing 112. The frame 230 may be affixed to the air fairing 112 by fasteners, rivets, adhesive, clips or latches, etc. It should be noted that the frame 230 is an optional structure, as the substrate 208 (and therefore the light sources 236 and indicium 212) may be directly affixed to an aperture in the air fairing 112, such as by bonding with an adhesive.

The illuminated air fairing display 123 according to the invention provides several benefits. The invention may provide a highly visible logo or other indicium. The logo or indicium may be customized. The logo or indicium may be visible at night or in poor visibility conditions.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. An illuminated air fairing display device adapted for use on a truck, comprising:
   an air fairing adapted to attach to a cab portion of said truck;
   a light transmissive region in said fairing comprising an illuminated air fairing display device; and
   a plurality of light sources positioned in close relation to said light transmissive region, wherein light emitted from said plurality of light sources passes through and illuminates said light transmissive region;
   wherein said illuminated air fairing display device is removably mounted to said air fairing.

2. An illuminated air fairing display device adapted for use on a truck, comprising:
   an air fairing adapted to attach to a cab portion of said truck;
   a light transmissive region in said fairing comprising an illuminated air fairing display device; and
   a plurality of light sources positioned in close relation to said light transmissive region, wherein light emitted from said plurality of light sources passes through and illuminates said light transmissive region;
   further comprising a frame that holds said illuminated air fairing display device in a corresponding aperture in said air fairing.

3. The device of claim 1, wherein said light transmissive region is formed into at least one indicium.

4. The device of claim 1, wherein said light transmissive region is formed into at least one logo.

5. The device of claim 1, wherein a light source of said plurality of light sources comprises a light-emitting diode (LED).

6. The device of claim 1, wherein a light source of said plurality of light sources comprises a substantially white light source.

7. The device of claim 1, wherein said plurality of light sources are substantially evenly spaced within said light transmissive region.

8. A method of forming an illuminated air fairing display for a truck, comprising the steps of:
   providing an air fairing adapted to attach to a cab portion of said truck;
   providing a light transmissive region in said fairing comprising an illuminated air fairing display device; and
   positioning a plurality of light sources in close relation to said light transmissive region, wherein light emitted from said plurality of light sources passes through and illuminates said light transmissive region;
   further comprising providing a removably mounted illuminated air fairing display device.

9. A method of forming an illuminated air fairing display for a truck, comprising the steps of:
   providing an air fairing adapted to attach to a cab portion of said truck;
   providing a light transmissive region in said fairing comprising an illuminated air fairing display device; and
   positioning a plurality of light sources in close relation to said light transmissive region, wherein light emitted from said plurality of light sources passes through and illuminates said light transmissive region;
   further comprising the step of providing a frame that holds said illuminated air fairing display device in a corresponding aperture in said air fairing.

10. The method of claim 8, wherein the step of providing said light transmissive region further comprises forming at least one indicium into said light transmissive region.

11. The method of claim 8, wherein the step of providing said light transmissive region further comprises forming at least one logo into said light transmissive region.

12. The method of claim 8, wherein the step of providing said plurality of light sources further comprises providing a plurality of light-emitting diodes (LEDs).

13. The method of claim 8, wherein the step of providing said plurality of light sources further comprises providing a plurality of substantially white light sources.

14. The method of claim 8, wherein the step of providing said plurality of light sources further comprises providing a plurality of substantially evenly spaced light sources within said light transmissive region.

15. The device of claim 2, wherein said light transmissive region is formed into at least one indicium.

16. The device of claim 2, wherein said light transmissive region is formed into at least one logo.

17. The device of claim 2, wherein a light source of said plurality of light sources comprises a light-emitting diode (LED).

18. The device of claim 2, wherein a light source of said plurality of light sources comprises a substantially white light source.

19. The device of claim 2, wherein said plurality of light sources are substantially evenly spaced within said light transmissive region.

20. The method of claim 9, wherein the step of providing said light transmissive region further comprises forming at least one indicium into said light transmissive region.

21. The method of claim 9, wherein the step of providing said light transmissive region further comprises forming at least one logo into said light transmissive region.

22. The method of claim 9, wherein the step of providing said plurality of light sources further comprises providing a plurality of light-emitting diodes (LEDs).

23. The method of claim 9, wherein the step of providing said plurality of light sources further comprises providing a plurality of substantially white light sources.

24. The method of claim 9, wherein the step of providing said plurality of light sources further comprises providing a plurality of substantially evenly spaced light sources within said light transmissive region.

* * * * *